United States Patent [19]

Hakhverdian

[11] 4,377,912
[45] Mar. 29, 1983

[54] APPARATUS FOR SENSING AND/OR MEASURING CHANGES IN INCLINATIONS

[76] Inventor: Armik A. Hakhverdian, 1153 Janis Way, San Jose, Calif. 95125

[21] Appl. No.: 199,040

[22] Filed: Oct. 20, 1980

[51] Int. Cl.$^3$ .............................................. G01C 9/06
[52] U.S. Cl. .................................................... 33/366
[58] Field of Search .......................................... 33/366

[56] References Cited

U.S. PATENT DOCUMENTS

| 2,893,134 | 7/1959 | Shea et al. | 33/366 |
| 3,096,591 | 7/1963 | Higgins et al. | 33/366 |
| 3,906,471 | 9/1975 | Shawhan | 33/366 X |
| 4,167,818 | 9/1979 | Cantarella et al. | 33/366 |

Primary Examiner—Charles E. Phillips
Attorney, Agent, or Firm—Wenderoth, Lind & Ponack

[57] ABSTRACT

A sensor which presents a capacitance which is a function of its inclination comprises an elongated sealed chamber which is partially filled with a liquid dielectric, the remaining space being occupied by air or a suitable gas. The chamber is provided with a pair of electrodes which are arranged to lie generally one above and the other below the liquid/gas interface at a particular angle of inclination of the chamber whereby a change in this inclination produces a corresponding change in the capacitance between the electrodes. The chamber may be straight with the electrodes arranged at one end or arcuate with the electrodes arranged at the centre. The sensor may be used with a means for producing an indication of inclination and this means may comprise a capacitance bridge or a tuned base tuned collector oscillator with the sensor connected to decouple the emitter whereby a change in capacitance will vary the collector current, which in turn may be applied to control an indicating instrument, a digital read-out or an audible beat note.

10 Claims, 4 Drawing Figures

HORIZONTAL PLANE

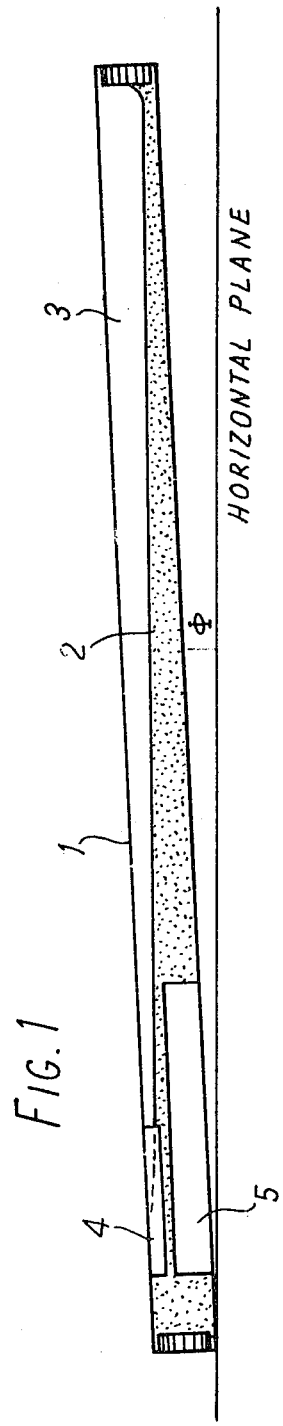
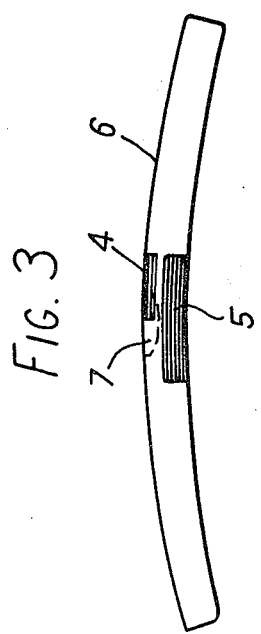
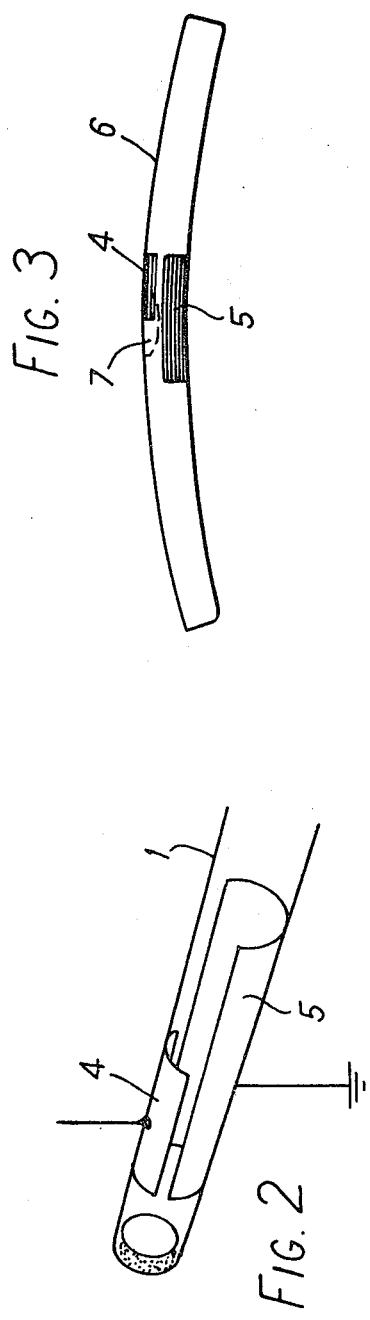

APPARATUS FOR SENSING AND/OR MEASURING CHANGES IN INCLINATIONS

BACKGROUND AND SUMMARY OF THE INVENTION

This invention relates to apparatus for sensing and/or measuring changes in inclination. Such apparatus has many applications, for example in one form the apparatus may be used in the same manner and for the same purpose as a conventional spirit level. The apparatus may also be used to sense or measure small variations in tilt of a surface from a datum position, for example a truly horizontal or vertical position. Since the apparatus may also be used to measure the deflection of a structure when a load is applied thereto it may also function as a strain gauge.

It is an object of the present invention to provide an apparatus of the above kind which is simple and reliable in use but which, if desired, may also be arranged to provide a high degree of sensitivity so that very small changes in inclination may be measured with precision.

The present invention, in one aspect, consists in a sensor responsive to changes in inclination which comprises an elongated sealed chamber which is partly filled with a liquid dielectric, the remaining space being occupied by air or a gas, and a pair of electrodes associated with the chamber in such position as to lie generally one above and the other below the liquid/gas interface at a particular angle of inclination of the sensor, whereby a change in this inclination produces a corresponding change in the capacitance between the electrodes.

Conveniently the length of the upper electrode is of the order of one half the length of the lower electrode as measured in the direction of the length of the chamber, while in a preferred arrangement one end of the upper electrode is disposed approximately at the centre of the length of the lower electrode.

The present invention, in another aspect, consists in an apparatus for indicating or measuring inclination or changes in inclination comprising a sensor as above described and means for producing an indication of changes in capacitance between the electrodes of the sensor.

In one form the indication producing means may comprise a capacitance bridge having the sensor connected in one arm thereof. The bridge may be balanced for one particular inclination of the sensor and deviations from this inclination will be indicated.

In another form the indication producing means may comprise a tuned collector tuned base oscillator which operates in the region of 30 MHZ and has the sensor connected to decouple the emitter partially. In such arrangement which is sensitive to very small changes in capacitance the operating point of the transistor and hence its collector current will be proportional to the emitter decoupling capacitance, and therefore to the inclination of the sensor.

BRIEF DESCRIPTION OF THE DRAWINGS

In order that the invention may be clearly understood various forms thereof will now be described with reference to the accompanying drawings, in which:

FIG. 1 is a side elevation of one form of sensor in accordance with this invention;

FIG. 2 is an enlarged fragmentary perspective view of the sensor of FIG. 1;

FIG. 3 is a side elevation of a modified form of sensor and

Referring now to FIGS. 1 and 2 the sensor there shown comprises a glass tube 1 which may be about 8 mm diameter and about 130 mm long. The tube which is sealed at each end contains a liquid dielectric 2 and an amount of a gas 3, conveniently air. At one end, the left-hand end in FIG. 1, a pair of electrodes 4, 5 are secured on the outer wall of the tube 1. These electrodes, which may be of metal foil, each extend around approximately half the circumference of the tube and as shown the length of the upper electrode 4 is about one half the length of the lower electrode 5 which is about 22 mm long and starts at about 8 mm from the end of the tube 1. Moreover the inner end of the upper electrode 4 is about coincident with the centre of the lower electrode 5.

Figure 4:
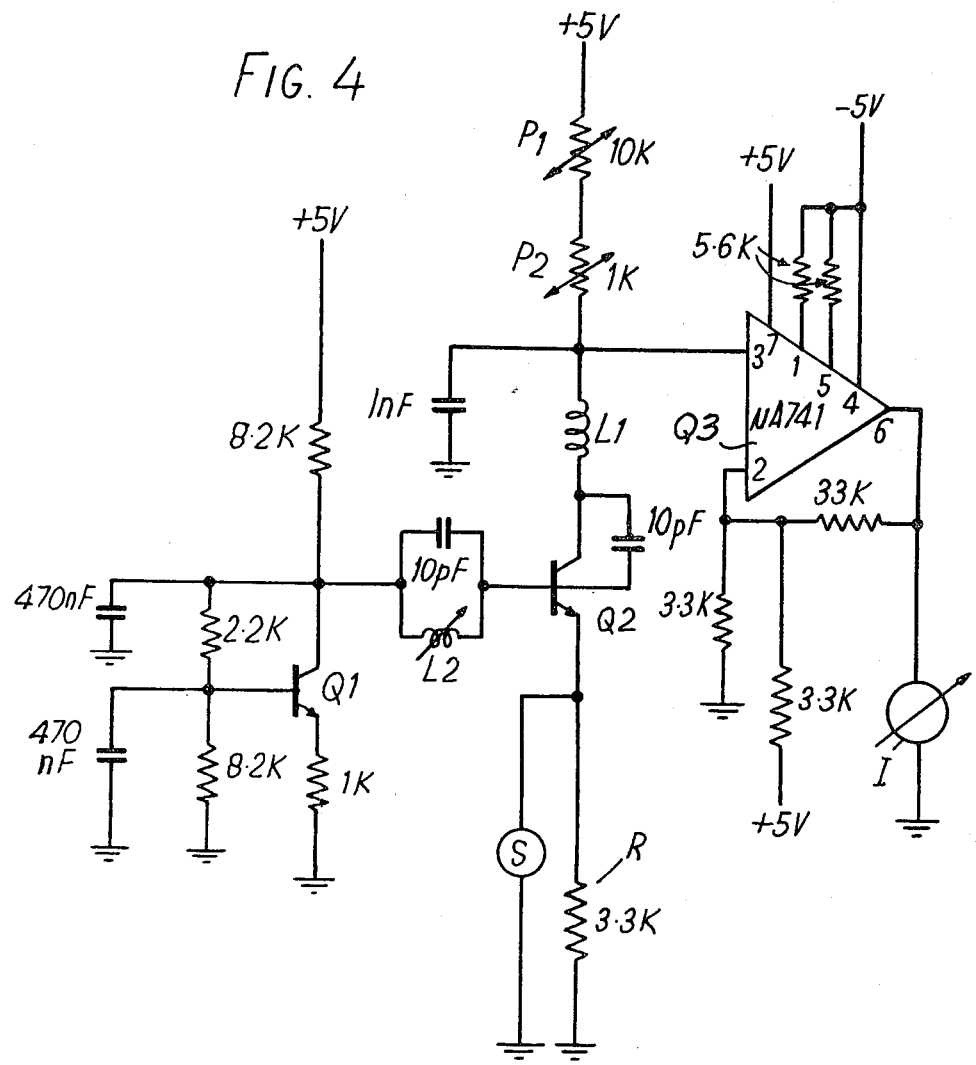
FIG. 4 is a circuit diagram of an indication producing means for use with the sensors of FIG. 1 or FIG. 3.

With the tube arranged at a datum position when it is at a slight angle of inclination $\phi$ to the horizontal, as shown, an end of the liquid/air interface is positioned at about the centre of the upper electrode 4.

In such arrangement and assuming no rotation of the tube about its longitudinal axis the capacitance between the electrodes will be directly proportional to the angle of inclination $\phi$ for small changes in this angle.

FIG. 3 shows a modification of the sensor of FIGS. 1 and 2 in which the tube 6 is slightly arcuate, the electrodes 4 and 5 are arranged at the centre of the tube and there is only a small amount of gas to form a bubble 7.

FIG. 4 shows an electronic circuit which is suitable for use with the sensors of FIG. 1 or FIG. 3 to provide an indication of changes in the angle of inclination of the sensor.

The circuit comprises a transistor Q2 which is arranged as a tuned collector, tuned base oscillator operating at a frequency of the order of 30 MHZ, and a transistor Q1 which improves the thermal stability of Q2 and provides bias. Both Q1 and Q2 are conveniently type LM 114 H transistors although other types may be used.

The emitter of transistor Q2 is connected to ground through a resistor R of relatively high value and the sensor S is connected in parallel therewith. The emitter is thus partly decoupled by the sensor capacitance with the result that the operating point of this transistor and hence its collector current is a function of the capacitance of the sensor and hence its angle of inclination $\phi$.

The resultant voltage change across P1 and P2 are applied to amplifier Q3 which in turn supplies current to a centre zero micro-ammeter I.

With the apparatus adjusted so that, for example, the meter reads zero when the sensor S is inclined by a small angle to the horizontal, any change in this inclination will produce a reading on the meter which is a function of the change in inclination.

To ensure the proper functioning of this circuit it is desirable that the applied voltages are stabilized.

Instead of using a meter the output of amplifier Q3 may be used to operate a digital read-out. Again the output of amplifier Q3 may be applied to control the frequency of a multivibrator the output of which may be mixed with a fixed frequency and applied to a sound reproducer so that the presence of an audible beat note, or equivantly its absence, indicates that the sensor is arranged in a truly horizontal plane or at some predetermined angle thereto.

If it is desired to monitor changes in inclination at a remote point the output of the amplifier Q3 may be applied to modulate a transmitter operating at a suitable frequency. Alternatively the variation in frequency of oscillator Q2 consequent a change in the sensor capacitance may be transmitted directly or after amplification.

The arrangement of FIG. 4 is very sensitive to small changes in capacitance and in conjunction with the sensor of FIGS. 1 or 3 may thus be used to indicate or measure very small angular changes in inclination.

The sensors of this invention may however be used in other arrangements and in one simple arrangement the sensor may be arranged in one arm of a capacitance bridge and the output of the bridge applied to a suitable indicator. Alternatively if the balance of the bridge is upset by a change in inclination of the sensor this bridge may be rebalanced and a measure of the change in inclination so obtained.

I claim:

1. A sensor responsive to changes in inclination, said sensor comprising:

a straight elongated sealed chamber having a longitudinal axis, which axis at a datum position, is inclined to the horizontal by a small angle and at a non-working position is parallel to the horizontal;

said chamber having an interior space partially filled with a liquid dielectric, with the remainder of said space being occupied by gas;

the volumes of said liquid dielectric and said gas being such that, with said axis of said chamber extending horizontally, said gas extends horizontally across said entire space between opposite ends of said chamber; and a pair of electrodes adjacent one end of said chamber, said electrodes being arranged such that a first said electrode is positioned above and a second said electrode is positioned below the gas-liquid interface with said interface contacting said first electrode in said datum positon, such that a change in the angle of inclination with respect to said datum position will produce a corresponding change in capacitance between said electrodes.

2. A sensor as claimed in claim 1, wherein the length of said first electrode is approximately one half of the length of said second electrode as measured in the direction of the length of said chamber.

3. A sensor as claimed in claim 2, wherein one end of said first electrode is located approximately opposite to the mid point of said second electrode.

4. A sensor as claimed in one of claims 2 or 3, wherein said chamber is cylindrical in section, and said electrodes are metallic coatings diposed on semi-cylindrical portions of the outer surface of said chamber.

5. An apparatus for indicating or measuring inclination or departure from a predetermined inclination, said apparatus comprising a sensor as claimed in claim 1, and means for producing an indication of change in capacitance between said electrodes of said sensor.

6. An apparatus as claimed in claim 5, wherein said indication producing means comprises a capacitance bridge having said electrodes of said sensor connected in one arm thereof.

7. An apparatus as claimed in claim 5, wherein said indication producing means comprises a tuned collector, tuned base oscillator, and said sensor is connected to control the decoupling of the emitter, such that the collector current is a function of the capacitance of said sensor.

8. An apparatus as claimed in claim 7, wherein changes in collector current are amplified and applied to control a center zero measuring instrument.

9. An apparatus as claimed in claim 7, wherein changes in collector current are applied to produce or control an audible beat note.

10. An apparatus as claimed in claim 7, wherein changes in collector current are applied to control a digital read-out.

* * * * *